United States Patent
Shau et al.

(10) Patent No.: US 7,148,583 B1
(45) Date of Patent: Dec. 12, 2006

(54) ELECTRICAL POWER GENERATORS

(76) Inventors: Jeng-Jye Shau, 991 Amarillo Ave., Palo Alto, CA (US) 94303; Albert Shau, 991 Amarillo Ave., Palo Alto, CA (US) 94303

( * ) Notice: Subject to any disclaimer, the term of this patent is extended or adjusted under 35 U.S.C. 154(b) by 0 days.

(21) Appl. No.: 11/162,285

(22) Filed: Sep. 5, 2005

(51) Int. Cl.
*F02B 63/04* (2006.01)

(52) U.S. Cl. ............ 290/1 R; 290/1 A; 290/1 E; 322/3; 310/12

(58) Field of Classification Search ........... 290/1 R, 290/1 A, 1 E; 322/3; 310/12, 66
See application file for complete search history.

(56) References Cited

U.S. PATENT DOCUMENTS

| | | | |
|---|---|---|---|
| 4,227,092 A | | 10/1980 | Campagnuolo et al. |
| 4,445,771 A | * | 5/1984 | Sakamoto et al. ......... 399/282 |
| 4,746,806 A | | 5/1988 | Campagnuolo et al. |
| 5,347,186 A | * | 9/1994 | Konotchick ............ 310/17 |
| 5,818,132 A | * | 10/1998 | Konotchick ............ 310/17 |
| 5,839,817 A | * | 11/1998 | Wei ..................... 362/192 |
| 5,905,359 A | | 5/1999 | Jimena |
| 6,056,889 A | * | 5/2000 | Tsuda et al. ............ 252/62.52 |
| 6,140,730 A | * | 10/2000 | Tkaczyk et al. .......... 310/181 |
| 6,208,743 B1 | * | 3/2001 | Marten et al. ........... 381/415 |
| 6,220,719 B1 | * | 4/2001 | Vetorino et al. ......... 362/192 |
| 6,261,471 B1 | * | 7/2001 | Tsuda et al. ............ 252/62.52 |
| 6,277,298 B1 | * | 8/2001 | Borduz et al. .......... 252/62.52 |
| 6,311,031 B1 | * | 10/2001 | Hirano ................. 399/101 |
| 6,768,230 B1 | * | 7/2004 | Cheung et al. .......... 310/30 |
| 6,809,427 B1 | * | 10/2004 | Cheung et al. .......... 290/1 R |
| 6,833,631 B1 | | 12/2004 | Van Breems |

* cited by examiner

*Primary Examiner*—Darren Schuberg
*Assistant Examiner*—Iraj A. Mohandesi

(57) ABSTRACT

The present invention provides methods to convert motion into electrical energy. These electrical power generators are made compatible with standard batteries so that they can support operations of existing battery powered portable appliances with no or minimal modifications. Electrical power generators of the present invention are therefore more convenient to use than conventional batteries while reducing the needs to replace or recharge batteries. Environment friendly methods are also introduced for generating electrical power.

12 Claims, 6 Drawing Sheets

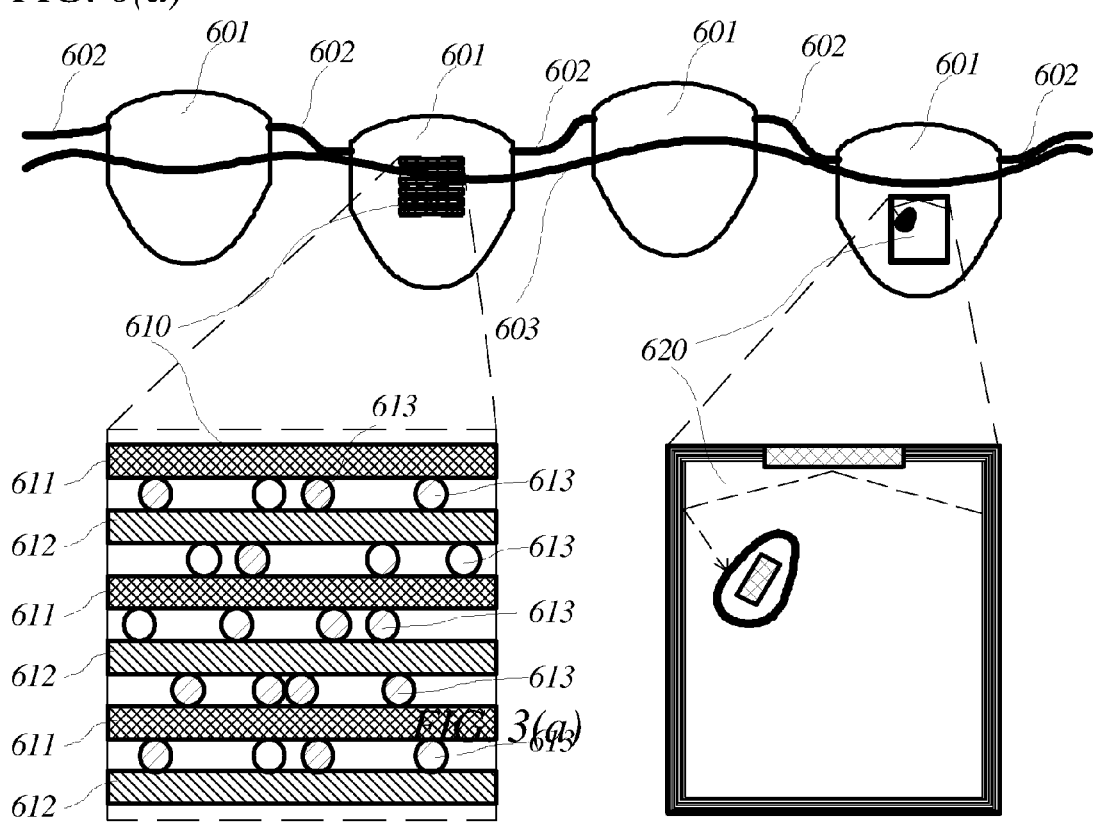

ELECTRICAL POWER GENERATORS

BACKGROUND OF THE INVENTION

The present invention relates to electrical power generators, and more particularly to electrical power generators that are compatible with battery powered portable appliances.

Current art portable electrical appliances, such as flash lights, remote controllers, pagers, cellular phones and laptop computers, require batteries as their power sources. Compared to electrical appliances that require power cords, these portable appliances are far more convenient to use. However, batteries run out of charge, limiting the time one can use certain appliances. Cameras run out of batteries when pictures need to be taken. Laptops shut down during important presentations. The constant need to replace or to recharge drained batteries is therefore a source of inconvenience for current art portable electrical appliances.

Many inventions have been developed to address this problem. Campagnuolo et al. disclosed a portable hand-cranked electrical power generator in U.S. Pat. No. 4,227,092, and a leg driven power generator in U.S. Pat. No. 4,746,806. Those power generators were "lightweight" at the time of the inventions, but are far too heavy for today's portable appliances. In U.S. Pat. No. 5,905,359, Jimena disclosed a relatively small electrical power generator installed in a flash light. This power generator used the batteries in the flash light as a flying wheel to store kinetic energy, and used magnetism to convert rotational motion of the flying wheel into electrical energy. Users must purchase special apparatuses installed with rotational batteries and power generators in order to utilize Jimena's invention. Haney et al. disclosed a manually-powered portable power generator. The apparatus comprises of a manually operable air pump that provides a compressed flow of air used to rotate an electrical power generator. Users must use a specially designed air pump and power generator to use the invention.

These inventions are all valuable methods to provide electrical power. However, none of them have been widely used. The major reason is that they miss the key value of portable appliances. The most important advantage of portable appliances is convenience. If the users need to purchase special apparatuses or wear special gears to charge portable devices, the additional inconvenience defeat the original purpose of portable appliances. Most users would rather use conventional batteries because of availability and convenience. To be popularly used, portable power generators must be made more convenient to use than conventional batteries. In order to achieve those goals, we believe that portable electrical power generators must be compatible with existing battery powered appliances. Such power generators should be as easy to use as conventional batteries, and be more convenient to replace or recharge.

Batteries have other problems. Much more energy is used to manufacture batteries than actually provided by the battery. When batteries are used up and discarded, the chemicals in the batteries pollute the environment. Typical battery usage is therefore a terrible pollution source. There are environment-friendly methods of generating electrical power such as solar cells or wind mills. Van Breems disclosed an apparatus to convert tidal energy into electrical energy in U.S. Pat. No. 6,833,631. However, these environment-friendly methods provide insignificant amounts of energy compared to overall energy consumption. Due to cost considerations, human beings are still burning oil, building dams, building nuclear power plants, and using energy-inefficient batteries, polluting the planet to feed energy-hungry human societies. Although those environment-friendly methods have been available for decades, they will not be fully utilized unless their cost is comparable to polluting methods. It is therefore highly desirable to provide cost efficient, environmentally friendly energy sources.

SUMMARY OF THE INVENTION

The primary objective of this invention is, therefore, to provide portable electrical power generators that are more convenient to use than conventional batteries. The other primary objective of this invention is to provide cost-efficient and environment-friendly methods of generating electrical power. These and other objectives are achieved by providing electrical power generators that are compatible to conventional batteries and by providing environment-friendly methods of building electrical power generators.

While the novel features of the invention are set forth with particularly in the appended claims, the invention, both as to organization and content, will be better understood and appreciated, along with other objects and features thereof, from the following detailed description taken in conjunction with the drawing.

BRIEF DESCRIPTION OF THE DRAWINGS

FIG. 6 shows an environment-friendly cost-efficient method to convert tidal energy into electrical energy.

DETAILED DESCRIPTION OF THE INVENTION

The present invention describes methods to make electrical power generators that convert motion into electrical energy. In addition, these methods make the power generators user friendly by making them compatible with existing battery powered appliances. For simplicity, we will call such "motion-activated battery-compatible electrical power generating device" of the present invention a "motion cell" or "m-cell". In most of the preferred embodiments, an m-cell of the present invention can replace a conventional battery to allow an existing battery-powered appliance to function normally with no or minimal modifications to the appliance. The word "compatible" in our definition does not always mean identical in every detailed specification. For example, the storage capacity of an m-cell is often less than the storage capacity of a conventional battery of the same size, but the life time of an m-cell is usually much longer than the life time of a conventional battery because of its capability to recharge itself. The output of an m-cell does not always need to be at constant voltage like most conventional batteries. An m-cell is "compatible" with a conventional battery in terms of its user-friendliness in replacing existing batteries while making battery powered appliances function normally, but it is not necessarily always able to replace batteries for all applications. For example, m-cell is especially useful for applications that require small bursts of energy such as remote controllers, flash lights, cellular phones, etc., but m-cell may be only helpful but not replaceable for other applications, especially those that require constant high power operations.

To facilitate clear understanding of the present invention, simplified symbolic views are used in the following figures. Objects are often not drawn to scale in order to show novel features clearly.

Figure 1A:
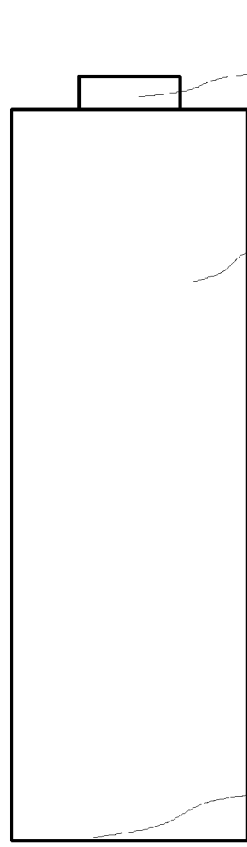
FIGS. 1(a–c) illustrate one example of an electrical power generator of the present invention that is compatible with standard size AA conventional batteries.
FIG. 1(d) is a symbolic circuit diagram showing electrical connections for the electrical power generator shown in FIGS. 1(a–c)
Figure 1B:
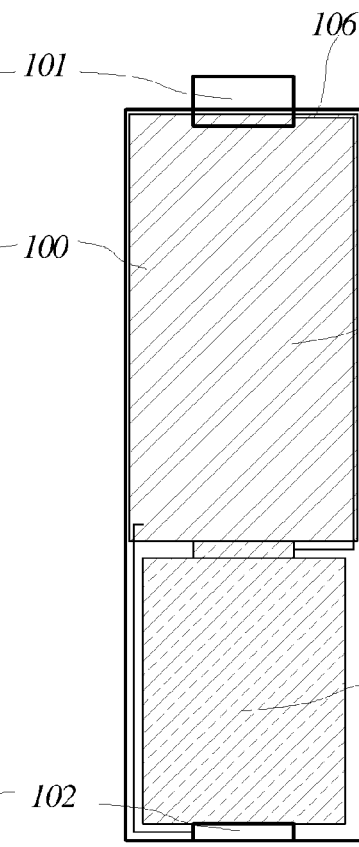
Figure 1C:
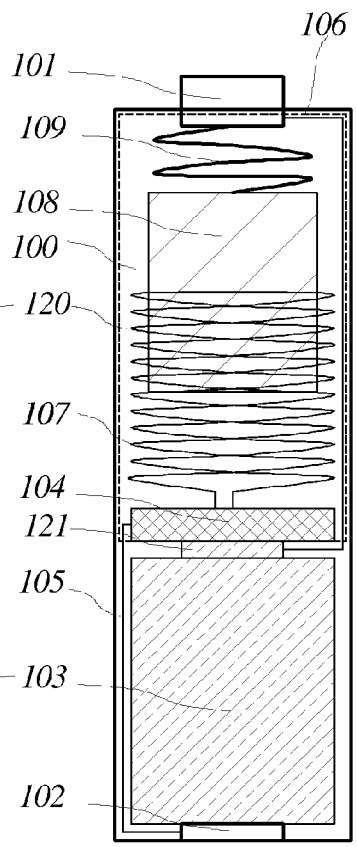
Figure 1D:
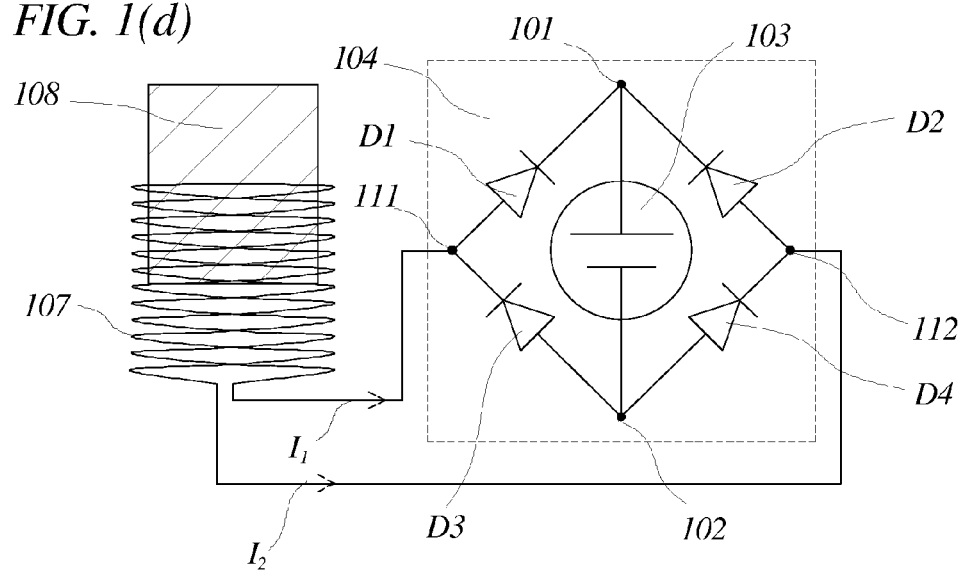

FIG. 1(a) shows the external view of one example of an m-cell (100) of the present invention that is similar in external dimension to a standard AA battery. This m-cell (100) has an anode (101) electrode and a cathode (102) electrode compatible with a standard AA battery. FIG. 1(b) is a cross-section diagram of the m-cell in FIG. 1(a), revealing that the m-cell comprises of a conventional rechargeable battery (103) and an electrical power generator (120). The size of the rechargeable battery (103) is smaller than a conventional AA battery in order to make room for the electrical power generator (120). Any well-known rechargeable battery, such as a Nickel Metal Hydride (Ni-MH) or Nickel Cadmium (NiCd) battery, can be used in this example. FIG. 1(c) is a cross-section diagram revealing one example of the electrical power generator (120) in FIG. 1(b) that comprises of a rectifier circuit (104), an electrical coil (107), and a magnet (108) that is attached to a spring coil (109). FIG. 1(d) is a symbolic circuit diagram illustrating the electrical connections of the components in the m-cell shown in FIG. 1(c). The rectifier circuit (104) is represented by a typical 4-diode (D1–D4) circuit configuration as shown in FIG. 1(d). The anode electrode (121) of the rechargeable battery (103) is connected to the anode electrode (101) of the m-cell (100) through an electrical connection (106), and to the rectifier circuit (104) as shown in FIG. 1(c) and FIG. 1(d). The cathode electrode of the rechargeable battery is connected to the cathode electrode of the m-cell (102), and to the rectifier circuit (104) through an electrical connection (105) as shown in FIG. 1(c) and FIG. 1(d). The electrical coil (107) is connected to the inputs of the rectifier circuit (104) as illustrated in FIG. 1(c) and FIG. 1(d). The magnet (108) is connected to the container of the m-cell through a spring coil (109) as illustrated in FIG. 1(c). In this configuration, external motion of the m-cell can cause the magnet (108) to vibrate up and down through the electrical coil (107). This motion induces changes in magnetic field in the coil that generates alternating electrical currents ($I_1$, $I_2$) as illustrated in FIG. 1(d). When the motion generated electrical current is in the direction of $I_1$, the current will flow through diode D1 and diode D4 to charge the rechargeable battery (103). When the motion generated electrical current is in the direction of $I_2$, the current will flow through diode D2 and diode D3 to charge the rechargeable battery (103). In other words, the rectifier circuit (104) redirects the generated currents ($I_1$, $I_2$) to the right polarity in order to charge the battery (103). This m-cell is fully compatible with conventional AA batteries while it is able to recharge itself by converting motion into electrical energy.

While specific embodiments of the invention have been illustrated and described herein, other modifications and changes will occur to those skilled in the art. For example, the shape of an m-cell does not have to meet the shape of a particular type of battery such as an AA battery; it can meet the shape of many kinds of existing batteries. The container of an m-cell also does not have to fit the space for one battery; it can fit into the space for two or more batteries, or the space for a fraction of a battery. In the above example, a typical 4-diode rectifier is used as one example of the rectifier circuit supporting an m-cell of the present invention. There are many other methods to implement rectifier circuits, ranging from mechanically controlled switches to highly sophisticated integrated circuits. Rectifiers are well known to those familiar with the art so there is no need to provide further details in our discussions. We also do not always need all the components shown in the above example. For certain applications such as a flash light, there is no need to use a rectifier in the m-cell. An m-cell also does not always need to work with an internal rechargeable battery. For example, we can replace the rechargeable battery with other types of storage devices such as capacitors. For many applications, we may not even need any storage devices in the m-cell. There are also many ways to implement electrical power generators for m-cells. In the above example, the vibrating motion of a magnet is converted into electrical energy. We can modify the configuration to allow an electrical coil to vibrate around a fixed magnet to achieve the same purpose. There are many other ways to build the power generator. A common way is to use a rotating magnet instead of vibrating magnet as illustrated by the example in FIG. 2.

Figure 2:
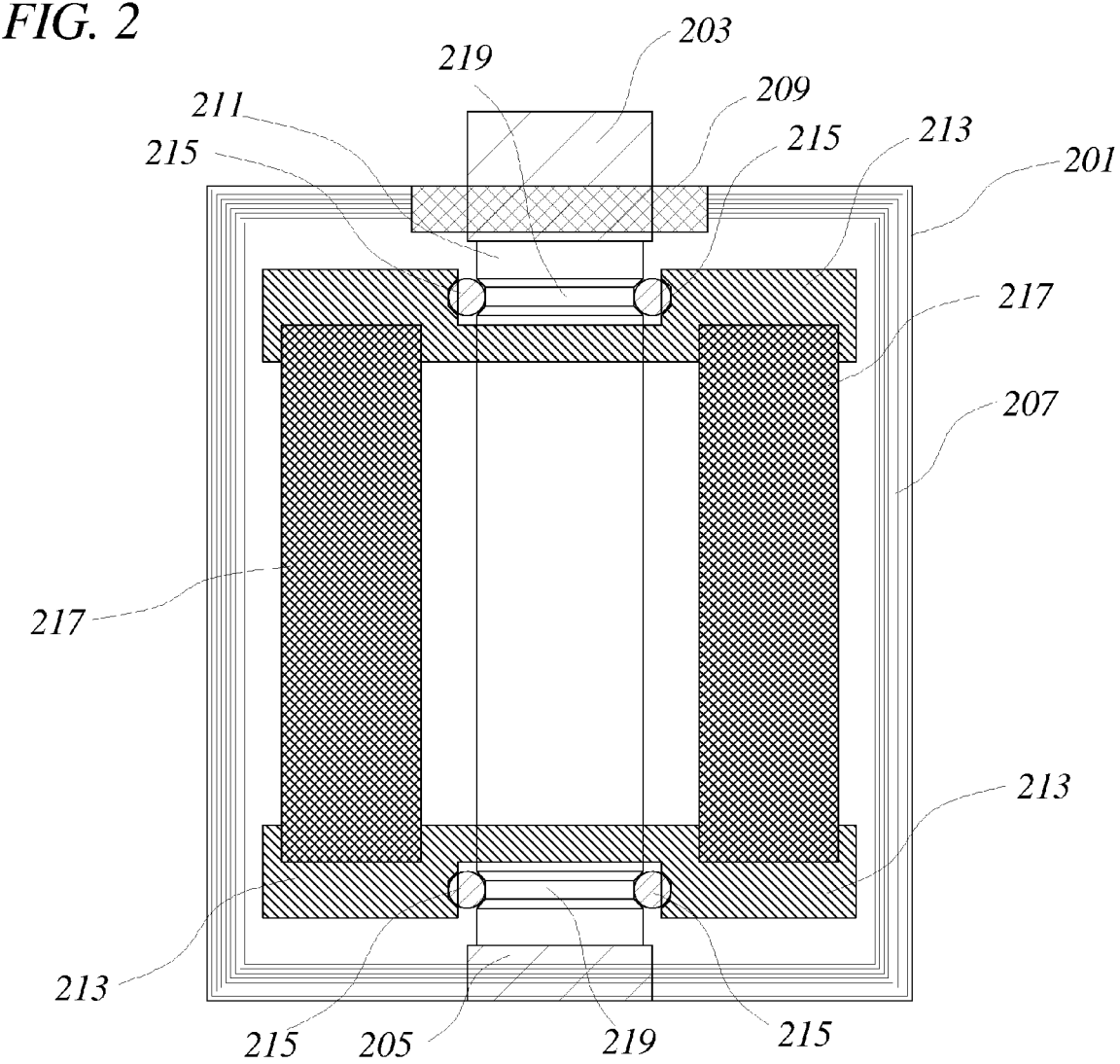
FIG. 2 illustrates one example of an electrical power generator of the present invention that is compatible with standard size D conventional batteries.

FIG. 2 illustrates an example of an m-cell (201) that is compatible with size D batteries. A rechargeable battery is placed within the center axis (211) of the container. The anode electrode of the rechargeable battery is connected to the anode electrode (203) of the m-cell and a rectifier circuit (209). The cathode electrode of the rechargeable battery is connected to the cathode electrode (205) of the m-cell and the rectifier circuit (209). The rectifier circuit (209) is also connected to electrical coils (207) surrounding the walls of the m-cell container. Two magnets (217) are placed on rotational frames (213). Rolling balls (215) moving within rotational channels (219) on the center axis (211) allow the rotational frames (213) to rotate around the center axis (211) with small friction. It is desirable to use two magnets (217) of different weight so that external motion of the m-cell will cause the magnets (217) to rotate around the center axis (211). The change in magnetic field induced by the rotational motions generates electrical currents that are redirected by the rectifier circuit (209) to charge the rechargeable battery based on similar principles as those used in the m-cell in FIGS. 1(a–d). This m-cell is therefore fully compatible with conventional size D batteries while it is also able to recharge itself by converting motion into electrical energy.

Figure 3A:
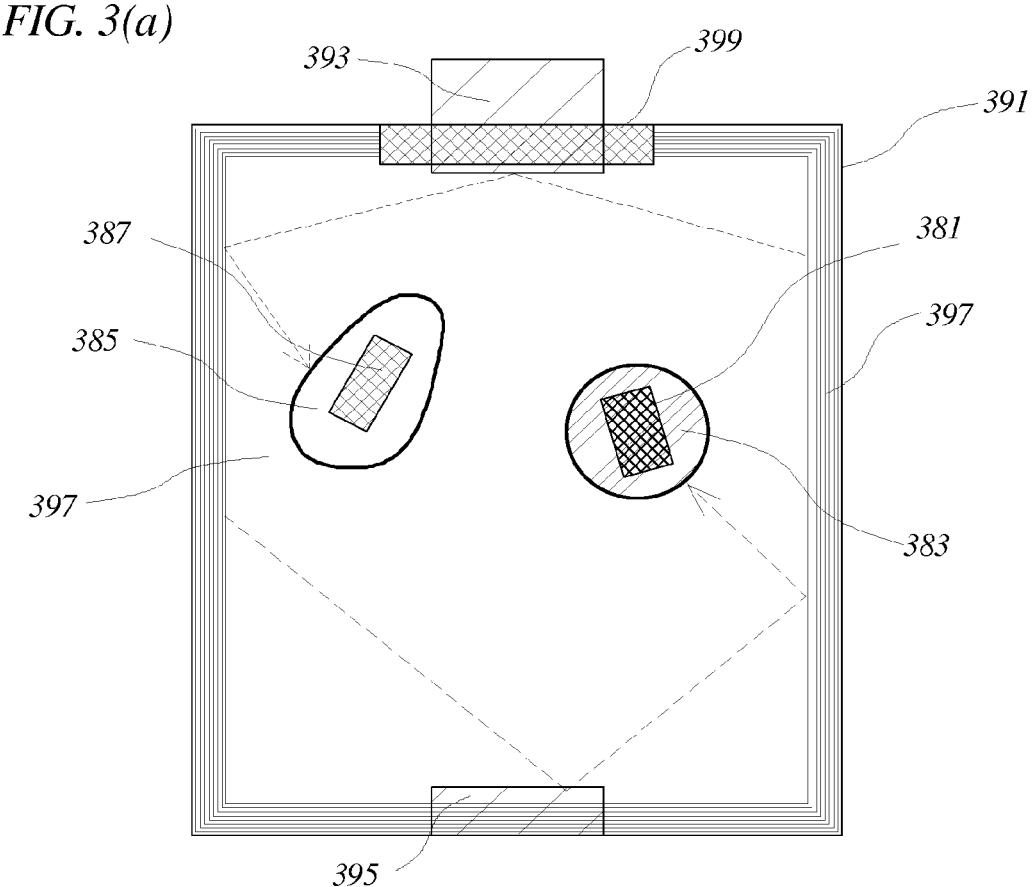
FIGS. 3(a–d) are examples of electrical power generators of the present invention that use free moving magnets to convert motion into electrical energy.

For the examples in FIGS. 1–2, external motion of an m-cell is converted into one dimensional motion (back and forth motion in FIG. 1 and rotation along one axis in FIG. 2) of magnets relative to electrical coils in order to convert motion into electrical energy. FIG. 3(a) shows an example of an electrical power generator of the present invention that is able to convert multiple dimensional motions into electrical energy. Similar to the example in FIG. 2, the m-cell (391) in FIG. 3(a) has a container, an anode electrode (393), and a cathode electrode (395) making it compatible with conventional batteries. A rechargeable battery may be placed inside but it is not shown for simplicity. Similar to the m-cell in FIG. 2, this m-cell (391) is also surrounded by electrical coils (397) that are connected to a rectifier circuit (399). These configurations allow the m-cell (391) to generate electrical energy as soon as there is a changing magnetic field within the electrical coils (397). In this example, the changing magnetic field is provided by a free moving magnet (381) in a bouncing ball (383). There are many ways to build this bouncing ball (383); one example is to coat a magnet (381) with elastic materials like rubber. External motion of the m-cell (391) can cause the bouncing ball (383) to bounce around and to rotate within the electrical coils (397) causing changes in magnetic fields that generate electrical currents. The three dimensional motions plus rotational motions of the bouncing ball (383) all can generate electrical energy. The bouncing ball also does not have to be a sphere. An irregular shape is actually preferable because it can cause rapidly changing magnetic fields. FIG. 3(a) also shows another example of a free-moving object (385) that has a magnet (387) coated by irregularly shaped elastic materials. Although two bouncing objects (383, 385) are shown in FIG. 3(a) for convenience in drawing, it is usually undesirable to have two such bouncing objects within one container because they will tend to cancel the power generating effects of each other.

Figure 3B:
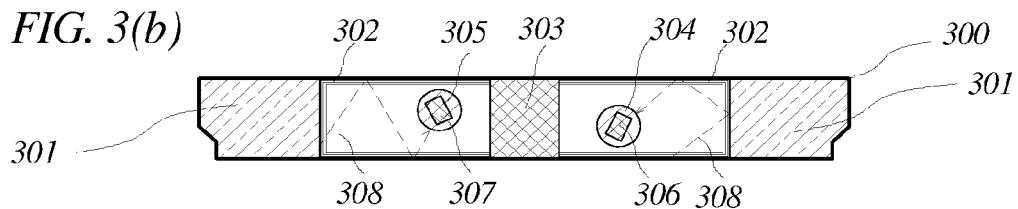

Manufacture procedures for the bouncing magnets (383, 385) can be extremely simple and inexpensive. Such simplicity in manufacture provides the flexibility to make free-moving magnets in very small sizes, allowing the possibility to build small size m-cells. FIG. 3(b) shows an example of an m-cell (300) of the present invention that is made compatible with a typical button cell or coin cell battery. Coin cells are typically used in car keys with a thickness of around one millimeter (mm) and a diameter of around 15 mm. Button cells are typically used in electrical watches and cameras with a thickness of around 5 mm and a diameter of less than 10 mm. It is nearly impossible to put prior art electrical power generators into such small dimensions. The m-cell shown in FIG. 3(b) is compatible in size with a typical coil cell. The inner space of the m-cell comprises of one or more chambers (308). Each chamber (308) comprises of electrical coils (302) and space for small free-moving magnet(s) (304, 305) of the present invention. It is typically desirable to place a rechargeable battery (301) and rectifier circuit (303) in the m-cell as illustrated in FIG. 3(b). External motions of the m-cell (300) can cause the bouncing magnets (304, 305) to bounce around and to rotate relative to the electrical coils (302) in the chambers (308). The magnets (306, 307) in the free-moving objects (304, 305) create changes in magnetic field to charge the rechargeable battery (301) through the rectifier circuit (303) in similar ways as in previous examples.

Figure 3C:
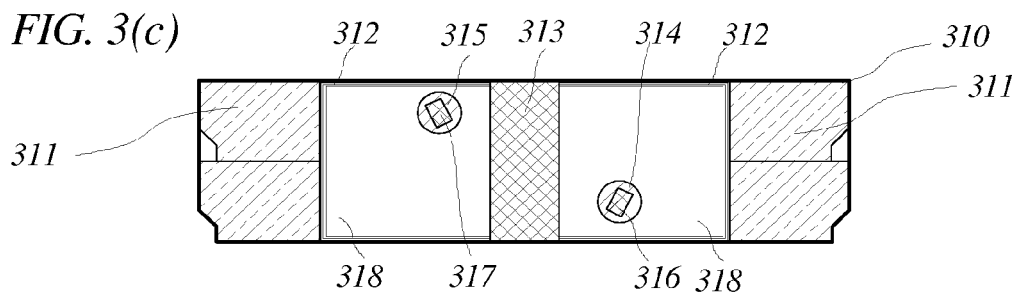

Although the m-cell of the present invention can function in a very small space, it is still desirable to have more space for simpler manufacture procedures. FIG. 3(c) shows an example of an m-cell (310) that is made compatible to fit into the space of two stacked coin cells. In this way, one can double the volume of the bouncing chambers (318) and have space for more electrical coils (312). The magnets (316, 317) in the bouncing balls (314, 315) can have more space than in the previous example. This m-cell (310) also can have rechargeable batteries (311) and rectifier circuits (313) similar to previous examples. Most car keys use two stacked coin cells instead of one coin cell. We can replace two stacked coin cells with one m-cell shown in FIG. 3(c) or two m-cells shown in FIG. 3(b).

The m-cells of the present invention are extremely user friendly. For example, we can use m-cells to replace the batteries in a television remote controller without making any changes to the TV remote controller. Whenever the m-cell is running low in charge, a few shakes of the remote controller will charge it enough to support further operations. We also can use m-cells to replace the batteries in a garage door remote controller. When a garage door controller is placed in a car, the natural vibrations and accelerations of the car can keep the m-cells charged. The garage door remote controller will not run out of batteries any more. When a properly designed m-cell is used in a cellular phone, the natural motion of the user is usually enough to keep the m-cell charged—significantly reducing the inconvenience of recharging cellular phone batteries. The present invention certainly can support most battery powered toys.

Figure 3D:
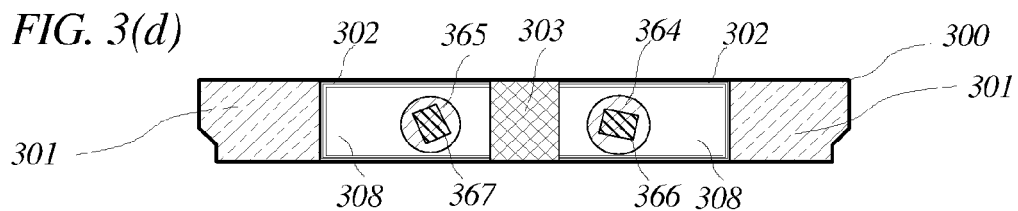

While specific embodiments of the invention have been illustrated and described herein, it is realized that other modifications and changes will occur to those skilled in the art. The scope of the present invention should not be limited by above specific examples. For example, there are many ways to implement electrical coils for generating electrical power from changing magnetic fields. Detailed designs of those electrical coils are therefore not shown in the above discussions. The m-cells of the present invention can be compatible with all kinds of conventional batteries including, but not limited to, sizes AAA, AA, A, B, C, D, coin cells, button cells, rectangle cells, cellular phone cells, laptop computer batteries, etc. In our examples, the bouncing magnets are coated with elastic materials in order to preserve kinetic energy. In many cases, there is no need to coat the magnets with elastic materials. Free-moving magnets of any shape are applicable. The motions of magnets do not have to be bouncing; other kinds of free motions such as rolling or tumbling also work well. For example, the m-cell shown in FIG. 3(d) is nearly identical to the m-cell shown in FIG. 3(b) except that the bouncing balls (304, 305) are replaced with rolling cylinders (364, 365) that comprise of magnets (366, 367). The rolling motion of the cylinders (364, 365) can cause the magnets (366, 367) to change magnetic fields to generate electric energy.

A free-moving magnet used in the present invention is defined as a magnet that does not have bondage such as rotation frames or spring coils to constrain its motion to one-dimensional motion. Conventional magnetic power generators always confine the motion of magnets relative to electrical coil using rotational frames or vibration spring coils. The magnets or coils are always bounded for linear motion or rotational motion. Such constraints limit the freedom to convert different types of motion into electrical power. The need to provide moving parts such as rotational frames or vibrating frames also makes it more complicated to manufacture. The free moving magnets in the above examples are allowed to move freely in a given container without bondage from frames or springs. The manufacture procedures for such free moving magnetic are simplified, and more freedom in converting different types of motion into electrical energy is attained. Due to simplicity, the free-moving magnet cells are extremely easy to manufacture compared to other types of magnetic power generators. The major disadvantage is its irregular power output due to irregular changes in magnetic fields. The rectifier circuits supporting free-moving magnet cells may need to be more complex than conventional rectifier circuits. Fortunately, current art integrated circuit technologies allow design of highly sophisticated rectifying circuits that can be optimized for such applications. Another method to regulate the output of the free-moving magnet cells is to simplify the motions of the magnets; one example is to allow only rolling motions along one direction.

For the above examples, magnetic mechanisms are utilized as the electrical power generating mechanism. Other mechanisms are also applicable for m-cells of the present invention.

Figure 4A:
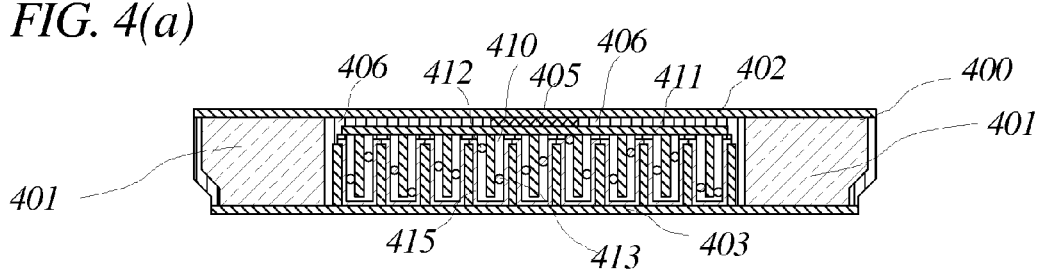
FIGS. 4(a–d) are examples of friction cells of the present invention that use friction to convert motion into electrical energy.
Figure 4B:
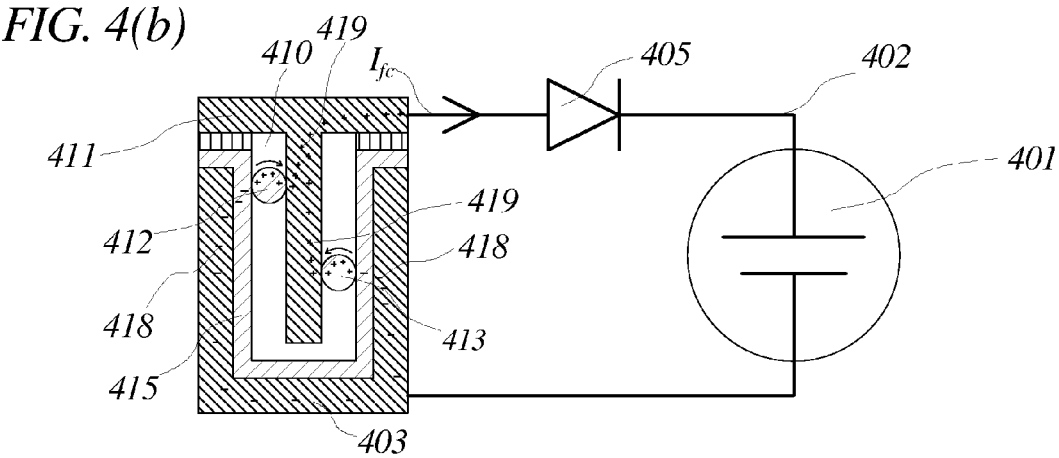

FIG. 4(a) shows an example of an m-cell (400) of the present invention that is similar in external shape to the example shown in FIG. 3(b). It also can have rechargeable batteries (401) that can be placed in similar ways. The anode electrode of the rechargeable battery is connected to the anode electrode (402) of the m-cell (400). The cathode electrode of the rechargeable battery is connected to the cathode electrode (403) of the m-cell (400). There are a plurality of "friction cells" (410) packed inside the m-cell (400). A magnified cross section view for one of the friction cells (410) is shown in FIG. 4(b). FIG. 4(b) also shows symbolic circuit connections of the m-cell in FIG. 4(a). A friction cell of the present invention generates electric energy from friction between different materials. For this example, the friction cell comprises of a cathode electrode that is also connected to the cathode electrode (403) of the m-cell (400). The cathode electrode of the friction cell is covered by a layer of friction coating (415) as illustrated in FIG. 4(a) and FIG. 4(b). The anode electrode (411) of the friction cell is connected to a rectifier circuit (405) as shown in FIG. 4(a). The rectifier circuit (405) is represented by a single diode in FIG. 4(b) but there are many methods to implement this rectifier circuit. Inside the friction cell (400), there are rolling cylinders (412, 413) that roll between the friction cell anode electrode (411) and the friction coating (415) on the cathode electrode (403). For this example, we assume that the friction coating (415) is made of materials that have high electron affinity such as conductive plastic materials, and the rolling cylinders (412, 413) are made of conductive materials that have low electron affinity such as heavy metal. The friction generated by the rolling motion of those rolling cylinders (412, 413) can cause the rolling cylinders (412, 413) to carry positive charges (419) that are represented by (+) signs in FIG. 4(b). In the mean time, the friction will generate negative charges (418) on the friction coating (415). The negative charges (418) are represented by (−) signs in FIG. 4(b). Due to voltage differences, the positive charges (419) will flow to the anode electrode (411) of the friction cell (410), and the negative charges (418) generated by friction will flow to the cathode electrode (403). The charge flows creates an electrical current ($I_{fc}$) that can charge the rechargeable battery (401). In such ways, the external motions of the m-cell (400) can cause friction between the rolling cylinders (412, 413) in the friction cells (410) to generate electrical energy.

Figure 4C:
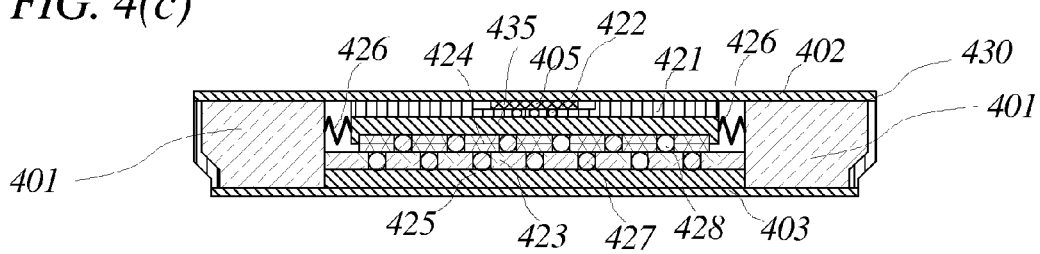
Figure 4D:
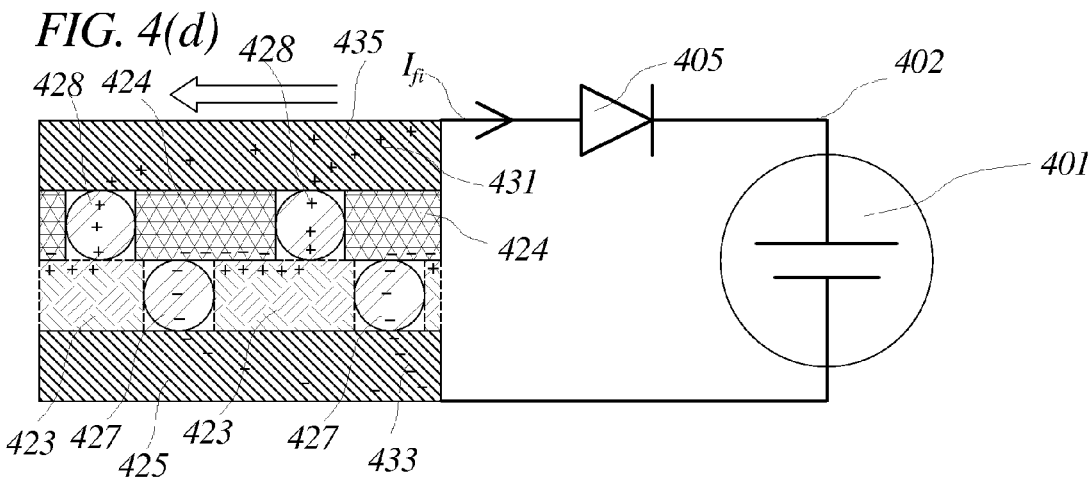

Friction cells of the present invention can be implemented in many ways. FIG. 4(c) shows another example that has a similar structure to that in FIG. 4(a) except that its friction cell comprises of two friction planes (425, 435). The bottom friction plane (425) is a fixed conductive plate connected to the cathode electrode (403) of the m-cell (430). There are friction coating (423) materials attached to this bottom friction plane (425), and conductor rolling cylinders (427) placed between the friction coating (423) as illustrated by the magnified cross section drawing in FIG. 4(d). FIG. 4(d) also shows the symbolic circuit connections for the m-cell (430) in FIG. 4(c). The top friction plane (435) is a movable conductor plate attached to spring coils (426) as illustrated in FIG. 4(c). There are friction coating (424) materials attached to this top friction plane (435), and conductor rolling cylinders (428) placed between the friction coating (424) as illustrated by FIG. 4(d). This top friction plane (435) is also the anode electrode of the friction cell that is connected to a rectifier circuit (405) through conductor rolling cylinders (422) as illustrated in FIG. 4(c). External motion of the m-cell (430) can cause the top friction plane (435) to vibrate relative to the bottom friction plane (425). The two kinds of friction coating (423, 424) attached to the two friction planes (425, 435) generate electrical charges (431, 433) while rubbing against each other. In this example, we assume the bottom friction coating (423) generates positive charges (431) while the top friction coating (424) generates negative charges (433). When the bottom friction coating (423) touches the top rolling cylinders (428), positive charges (431) will flow toward the anode plane (435). When the top friction coating (424) touches the bottom rolling cylinders (427), negative charges (433) will flow toward the cathode plane (425). The charge flow generates an electrical current ($I_{fi}$) that can charge the rechargeable battery (401). In such ways, the external motions of the m-cell (430) can generate electrical energy.

Friction was the earliest method to generate electricity in the earliest days of scientific studies of electricity, but magnetism became the dominating mechanism for electrical power generators. There is lot of room for improvement to find better materials and to have better designs in friction cells of the present invention. Unlike magnetic power generators, friction cells do not require heavy materials such as magnets and electrical coils so that they have more flexibility in supporting applications of the present invention. Friction cells can be built from low cost materials or even bio-degradable materials. There is better flexibility to arrange friction cells into different shapes. Upon disclosure of the present invention, a wide variety of friction cells are expected to be developed.

Figure 5A:
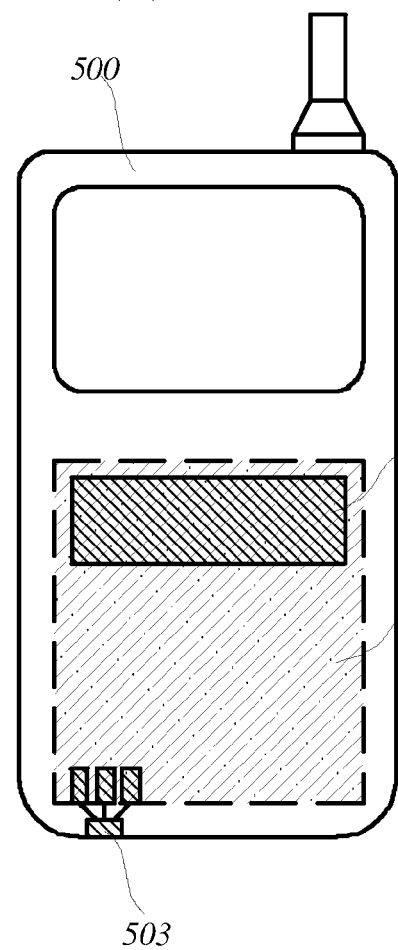
FIGS. 5(a–c) demonstrates different methods to make methods of the present invention compatible with existing electrical appliances.
Figure 5B:
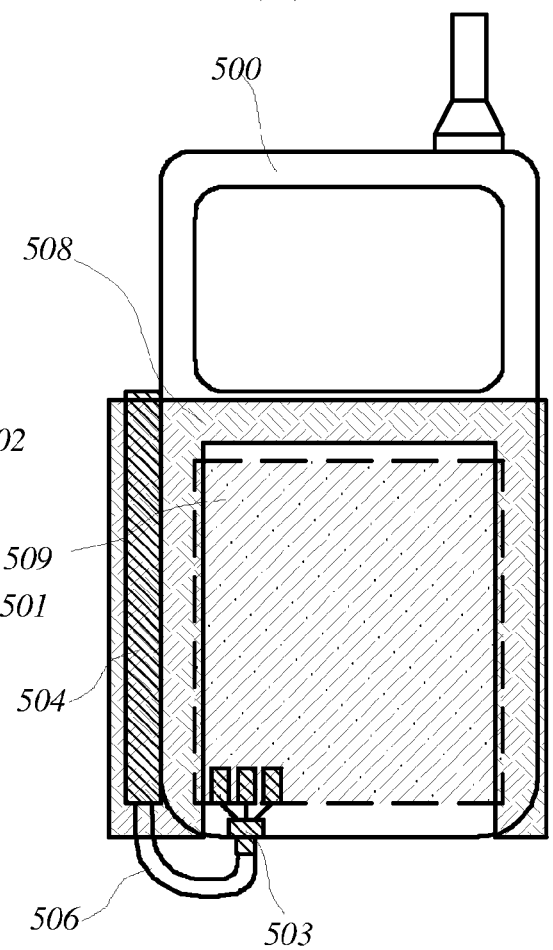
Figure 5C:
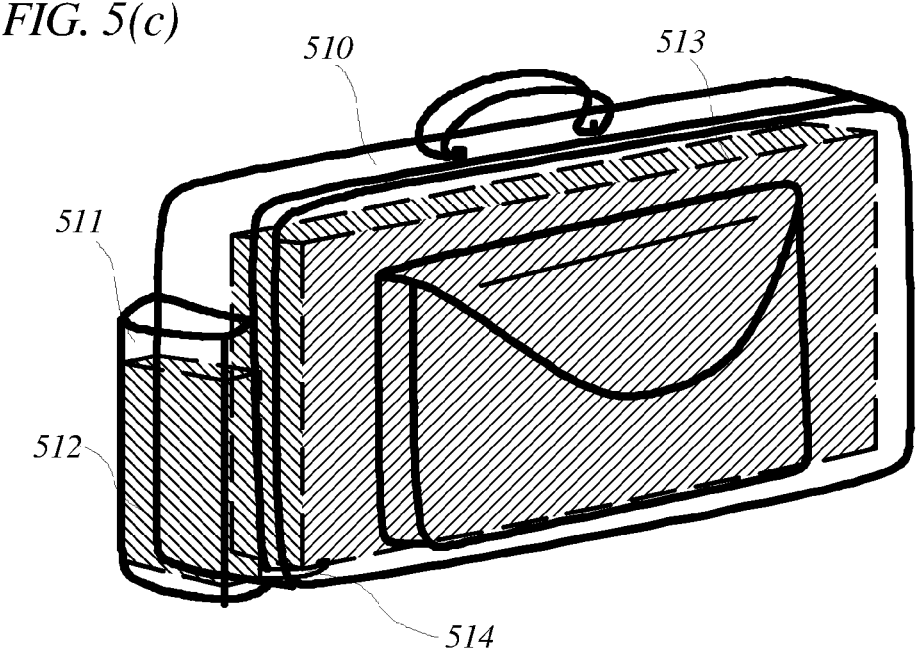

In the above examples, electrical power generators are placed in battery-shaped containers to make them compatible with existing batteries. That is not the only way to make electrical power generators compatible with existing battery-powered appliances. FIG. 5(a) shows a symbolic view for one example when a cellular phone (500) is equipped with a rechargeable battery (501). We can place an m-cell (502) of the present invention to occupy part of the space inside the battery (501) as a method to make m-cell compatible with a cellular phone (500). However, that is not the only method. Cellular phones are often placed in a protective coat (508). The battery (501, 509) used by cellular phones always has input socket (503) for chargers. We can place an m-cell (504) of the present invention attached to the protection coat as illustrated in FIG. 5(b), and connect the power output of the m-cell to the cellular phone battery (509) through existing input socket (503). In this way, we do not need to make any changes to existing cellular phones (500) and do not need to make any changes to existing cellular phone batteries (509), while we enjoy the convenience provided by m-cells (504) by attaching the m-cell to the cellular phone protection coat (508). Similar designs are applicable to other types of portable devices such as video recorders, digital cameras, I-pods, black berry, audio recorders, radios, or laptop computers. For example, an m-cell (512) can be placed inside a side pocket (511) of a typical bag (510) used to carry a lap-top computer (513) as illustrated in FIG. 5(c). The output of the m-cell (514) is plugged into the charger input of the laptop computer while the user carries the computer in the bag. When the bag (510) is carried or when it is placed in a vehicle, the natural motions of the bag (510) are constantly converted into electrical energy by m-cell (512) to keep the battery charged to help reduce the needs to recharge the battery. In the mean time, there is no need to make any changes to the laptop computer as well as its battery. The same bag also can be used to carry and to charge other types of portable appliances such as video recorders.

Besides providing additional conveniences for battery powered appliances, another primary objective of the present invention is to make energy generators more environment-friendly. By reducing the need to replace batteries, the present invention already can help reduce pollution. In addition, all the components for m-cells of the present invention can be manufactured without dangerous chemicals. The friction cells actually can be manufactured with bio-degradable natural materials at very low cost. Therefore, the present invention can provide environment-friendly methods to generate electrical power. FIG. 6 is a symbolic diagram showing a plurality of m-cells placed into buoys (601) that are placed on water (603) and linked by cables (602). The cables (602) contain electrical wires to transfer generated electrical energy to energy storage devices. The buoys (601) can be decorated as natural objects such as coconuts to make their look also environment-friendly. Any one of the m-cells of the present invention can be used for such applications. For example, we can use a friction cell (610) as shown by the magnified cross section diagram in FIG. 6. In this example, the friction cell (610) comprises of rolling balls (613) rolling between cathode plates and anode plates (611, 612). The water waves will cause those rolling balls to move around causing friction to separate positive and negative charges. Those separated charges are collected by the conductive cathode plates and anode plates to generate electrical power. FIG. 6 shows another example that uses a bouncing magnet cell (620) similar to the one in FIG. (2). Such power generators of the present invention are simple in structure so that electrical energy can be collected at very low cost. Those cells can be built completely from environment-friendly materials so that they won't cause any environment problems even when they are destroyed by accidents. We prefer not to place rechargeable batteries in the buoys to avoid chemical materials. An energy storage device can be placed on shore to store the energy generated by those m-cells. In such method, tidal energy can be converted into electrical power using cost efficient and environment-friendly methods. M-cells of the present invention also can be placed in vehicles such as boats, and the natural motion of the vehicles will create clean, cost efficient energy.

The m-cells of the present invention may not be the most efficient ways to collect energy because we emphasize convenience and cost efficiency rather than energy conversion efficiency. Existing clean energy collectors such as solar cells or wind mills are all excellent methods but they can not compete with oil in price. It will take huge investments, including changes in infrastructures in order to reduce reliance on oil for human societies. We believe the present invention provides methods that are low cost and easy to adapt. These low barrier methods can compete with oil in price, and they are very convenient in practical applications. It is our hope that motion cells can help human beings to burn less oil, build fewer dams, abandon nuclear power plants, and use energy-efficient battery to make this beautiful planet a better place to live.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

What is claimed is:

1. An electrical power generator comprising:
   (a) a motion cell that converts kinetic energy into electrical energy,
   (b) an anode electrode,
   (c) a cathode electrode, and
   (d) a removable container containing said motion cell, anode and cathode electrodes,
   wherein said electrical power generator is compatible with conventional battery or batteries wherein said container including said motion cell can replace conventional battery or batteries.

2. The motion cell in claim 1 comprises a magnet vibrating against an electrical coil.

3. The motion cell in claim 1 comprises a magnet rotating against an electrical coil.

4. The motion cell in claim 1 comprises a free moving magnet causing changes in magnetic field in an electrical coil.

5. The free moving magnet in claim 4 is coated with elastic materials.

6. The motion cell in claim 1 comprises friction cells that use friction between different materials to separated electrical charges.

7. A method for manufacturing electrical power generator comprising the steps of:
   (a) manufacturing a motion cell that converts kinetic energy into electrical energy,
   (b) providing an anode electrode to said electrical power generator,
   (c) providing a cathode electrode to said electrical power generator, and
   (d) manufacturing a removable container containing said motion cell, anode and cathode electrodes,
   wherein said electrical power generator is compatible with conventional battery or batteries wherein said container including said motion cell can replace conventional battery or batteries.

8. The method for manufacturing motion cell in claim 7 provides a magnet rotating against an electrical coil.

9. The method for manufacturing motion cell in claim 7 provides a magnet vibrating against an electrical coil.

10. The method for manufacturing motion cell in claim 7 provides a free moving magnet causing changes in magnetic field in an electrical coil.

11. The free moving magnet in claim 10 is coated with elastic materials.

12. The method for manufacturing motion cell in claim 7 provides friction cells that use friction between different materials to separate electrical charges.

* * * * *